United States Patent [19]

Damkjaer

[11] Patent Number: 5,127,515
[45] Date of Patent: Jul. 7, 1992

[54] CHAIN LINK CONVEYOR

[75] Inventor: Poul E. Damkjaer, Markvangen, Denmark

[73] Assignee: Maskinfabrikken Baeltix A/S, Vejle, Denmark

[21] Appl. No.: 590,924

[22] Filed: Oct. 1, 1990

[51] Int. Cl.⁵ .............................................. B65G 15/02
[52] U.S. Cl. .................................... 198/831; 198/841; 198/852; 198/853; 198/840
[58] Field of Search ............... 198/831, 841, 837, 852, 198/853, 840

[56] References Cited

U.S. PATENT DOCUMENTS

| | | | |
|---|---|---|---|
| 2,114,146 | 4/1938 | Klein et al. ........................ | 198/831 |
| 3,513,964 | 5/1970 | Imse .................................... | 198/852 |
| 4,627,529 | 12/1986 | Tarlton et al. ..................... | 198/500 X |
| 4,961,492 | 10/1990 | Wiseman et al. ................... | 198/841 |

Primary Examiner—D. Glenn Dayoan
Attorney, Agent, or Firm—Antonelli, Terry, Stout & Kraus

[57] ABSTRACT

A chain link conveyor which includes chain links and a curved section as well as an interacting arrangement in the shape of a longitudinally extending profile in the curved section, and downwardly extending parts on the chain links so that interacting slanting surfaces are provided. The interacting slanting surfaces permit the chain to be automatically held down in a correct plane during a passage of the chain links through the curves. A free passage is provided so as to enable the chain links to be lifted free of the track as soon as the chain link conveyor is stopped.

22 Claims, 3 Drawing Sheets 5,127,515

CHAIN LINK CONVEYOR

FIELD OF THE INVENTION

The invention relates to a new conveyor system in which a usually endless conveyor chain is displaced along a track. The new conveyor system may also be employed in the construction of courses consisting of several parallel tracks.

BACKGROUND OF THE INVENTION

It is well known in respect of chain link conveyors that the passage of horizontal curves may cause problems as the chain is apt to rise from the outermost sliding surface of the curve. This problem has for many years been redressed by side cams on the chain links, which side cams interact with the underside of the sliding surface. However, this solution implies several disadvantages. The construction enhances the friction; it is only possible to remove the chain for cleaning, from, for example, a curve section, by separating chain links to split up the chain and pulling the chain free of the curve section. Moreover, chains of this type have a tendency to produce noise and pulsations when passing curves.

A newer method for solving the problem in connection with the passage of curves is the employment of curve sections with built-in magnets which hold down the chain links in the horizontal plane through the curves. Hereby the possibility is provided of lifting the chain free of the track, also in curves, but then a greatly enhanced friction is produced, and the curve sections become very expensive and heavy due to the powerful magnets which have to be placed in the curve sections. Furthermore, the chain either has to be produced of a magnetizable material, or has to be provided with bits of magnetizable material embedded in each individual chain link. It is therefore not possible to employ chain links consisting purely of plastic for magnet curves. As a minimum, steel pins have to be employed for the coupling of the chain links for a magnet curve to be able to hold down the chain links.

SUMMARY OF THE INVENTION

The object of the invention is to present a completely new principle for automatically holding down a chain in the correct plane during the passage of curves, and by which principle the curve sections and the chain links are designed in such a way that the chain will automatically disengage when it is stopped, after which the chain may immediately be lifted free of the track or the curve section, for example for cleaning. In accordance with advantageous features of the present invention, a curved section for a chain link conveyor is provided, with the curved section comprising at least two parallel sliding surfaces disposed at a distance from each other, with a longitudinally extending slot or recess being disposed between the two surfaces for accommodating downwardly protruding parts of the channelings. At least one profile is provided in the slot or recess between the sliding surfaces, with the profile extending parallel to the sliding surfaces and constructed so as to interact with the downward protruding parts of the chain links.

The chain link conveyor of the present invention, may be displaceful along a track including two parallel sliding rails, with the chain including chain links of which adjoining links are interconnected. The links are supported on extending parts which slide on the sliding rail. and the parts connecting the adjoining chain links may protrude downwardly and be placed in an area between the sliding rails. Advantageously, the downwardly protruding parts may include projections which face a central plane of the chain link and are constructed so as to interact with a profile.

By virtue of the above-noted features of the present invention, a completely new principle for operating conveyor chains is realized in that so-called flex-chains, in curves, are obtained. The new principle may be employed in connection with almost any type of chain regardless of the manner in which the chain is otherwise constructed, that is, whether the top surface of the chain links are smooth or provided with ribs or rollers, or whether the top surfaces of the chain are provided with a friction means.

Furthermore, the new principle in accordance with the present invention may be used both in connection with chain links of plastic or links of steel.

Preferably, in accordance with the present invention, the profile has a through-going projection on a side facing outwardly in the curved section and a longitudinally extending slanting sliding surface may be provided on or at the projection. The slanting surface may be substantially planar and tilted inwardly toward a middle of the curved section.

The curved section of the present invention may, for example, comprise parallel side pieces, on which the sliding surfaces are provided, with a bridge piece being placed between and interconnected between the side pieces, with the bridge piece comprising the profile.

Advantageously, all the members of the curved section and the chain link conveyor may be integrally cast out of the same material which is, preferably, a synthetic material.

The side pieces in the curved section may be extended downwardly and include through-going parallel grooves or tracks on the sides facing each other, with the grooves being constructed for accommodating a return run of a chain of the chain link conveyor.

The longitudinally extending slanting sliding surface may, in accordance with the present invention, be placed further outwardly in the curved section than a centerline of the chain.

The chain link conveyor of the present invention may include at least one curved section wherein an area between the profile and an outermost side piece of the curved section provides a free passage which is large enough to permit the chain links to be lifted free of the curve section.

By virtue of the provision of the slanting surfaces and a pull in the chain, the chain is automatically held down in the correct horizontal level and the chain stays at the correct level even when the chain and the curved sections have been heavily abraded after a long period of operation. When the chain is stopped it may be lifted free of the track at any place in a curve for the purpose of, for example, cleaning of the same. This also applies when a plurality of chains are operated in close proximity to each other such as, for example, in curves of six-eight rows, in which case it is possible to lift the chains free of the course individually and completely independently of each other since the slanting side surface will shift the chain in a sideward direction when the chain is lifted and disengage the same from the track.

By virtue of the features of the present invention, a substantially noiseless and pulsationless operation is achieved because a tight side of the chain will always be placed on an outside of a centerline of the chain and also an inner side of the downwardly extending legs or parts of the chain may be constructed in such a manner that the chain is completely out of touch with the curved section.

In accordance with a fundamentally new transport or conveyor system constructed in accordance with the present invention, such system may comprise single tracks or courses including several parallel tracks, with both chain links and tracks being produced of any known material, that is, both steel and plastic, and corresponding to all conventional materials which transport systems with endless chains are presently made.

The conveyor system of the present invention may include at least one chain which is moved along at least one track consisting of parallel sliding rails in which a chain is provided consisting of uniform interconnected chain links. The chain links and the track may comprise interacting means so that the chain during operation automatically would be held down in the correct plane, even in curves, due to the forward progressing movement of the chain and by virtue of the provision of the downward protruding legs or side pieces with slanting surfaces.

Advantageously, a chain link constructed in accordance with the present invention may be constructed so that a number of links may be interconnected to form a conveyor chain, with one side of the chain link having at least one projection or a cam which has a slanted inward tilted side.

Any chain link of various types may be constructed with slanting sides at that side of the chain which faces downwardly during operation, so that the chain links may be used in connection with suitable tracks or sliding surfaces in order to obtain the advantages of the present invention.

The above and other objects, features and advantages of the present invention will become more apparent from the following description when taken in connection with the accompanying drawings which show, for the purpose of illustration only, one embodiment in accordance with the present invention.

FIG. 1 is a cross section of a curve section of a chain link conveyor according to the invention, along the plane II—II of FIG. 2, FIG. 2 is a top view of a part of a conveyor system according to the invention, FIG. 3A and 3B show an example of a plastic chain link according to the invention, FIG. 4A and 4B show an example of a steel chain link according to the invention, and FIG. 5 shows an example of a chain link conveyor according to a second embodiment of the invention.

DETAILED DESCRIPTION

Figure 1:
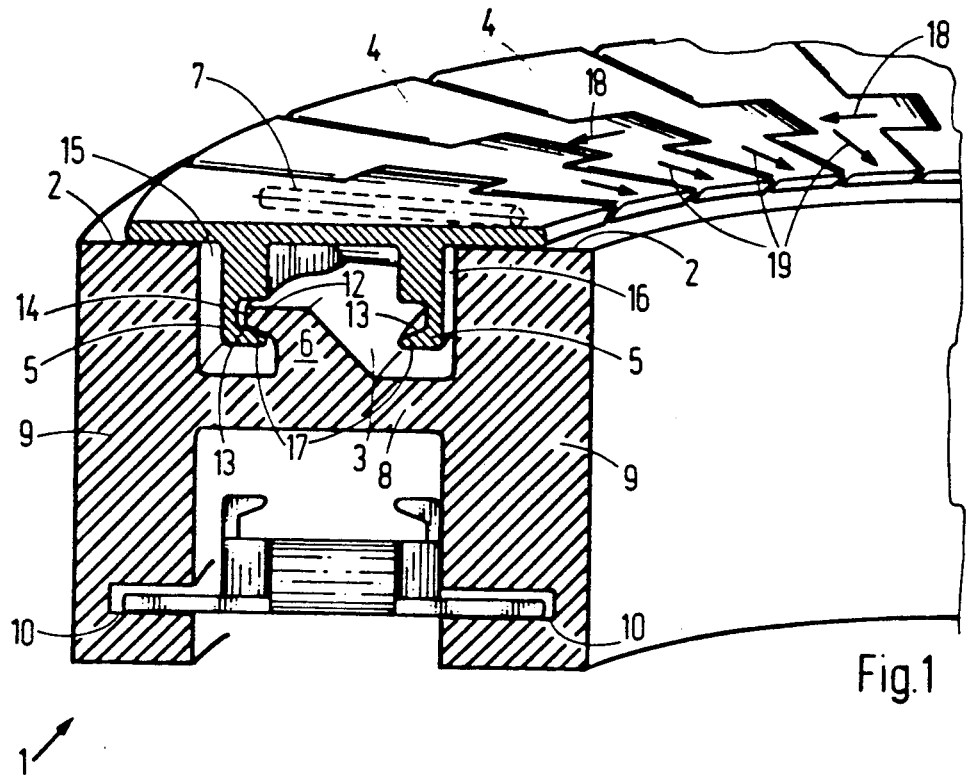

FIG. 1, which is a delineation of the principle of a chain link conveyor is shown comprising a curve section 1 and a conveyor chain 4 comprising a number of uniform chain links which are interconnected in a commonly known way.

It will be apparent to an expert in the field that a number of such tracks or conveyors may be placed parallel to and close to each other, so that a wider conveyor is formed if needed. Each chain 4 is driven by an individual driving wheel (not shown), and the endless chain is returned by return grooves 10 at the bottom of the side pieces 9 of the track. The return part may possibly, if there is a need or demand for complete cleaning of the conveyor chain, be designed as shown in the bottom part of FIG. 5, in which both the upper surface and the bottom side of the chain are accessible to cleaning.

The chain links 4 in FIG. 1 may for example be interconnected by means of a link pin 7 of steel or plastic, which link pin is only sketchily indicated as such connections are generally known. The chain links are supported on sliding surfaces 2 at each side, which sliding surfaces could for example be the top surface of the track or the curve section 1. A downward protruding part 5 is placed below each chain link at each side, which parts extend into a lengthwise extending slot or recess 3 between the sliding surfaces 2. The track proper, which in FIG. 1 is the curve section 1, furthermore comprises the two side pieces 9 which are connected by a bridge piece 8. The track or the curve section 1 is often produced integrally out of plastic, for example a low density polyethylene, by molding or machine finishing, but it may of course be produced of any suitable material with sufficient characteristics in way of strength etc. The sliding surfaces 2 may directly be the upper surfaces of the side pieces 9, but may also be mounted wear or sliding strips.

A longitudinally extending profile slide 6 is placed between the the sliding surfaces 2 and parallel to the sliding surfaces 2 and the side pieces 9, which profile 6 may be integral with the bridge piece 8 and arranged to interact with one of the downward protruding parts 5 at one of the sides of the chain link, as shown in the drawing. The interaction may be provided by the downward protruding parts 5 of the chain links 4 having a slanted downwards and inwards towards the central plane extending surface 13 which corresponds to a slanting surface 12 which extends in the same direction on the longitudinally extending profile 6. Projections 17, 14 are hereby provided on the chain links 4 and the profile 6, respectively. The surfaces 12, 13 are preferably placed further outwards in the curve than the central plane of the conveyor as shown in the drawing.

Figure 2:
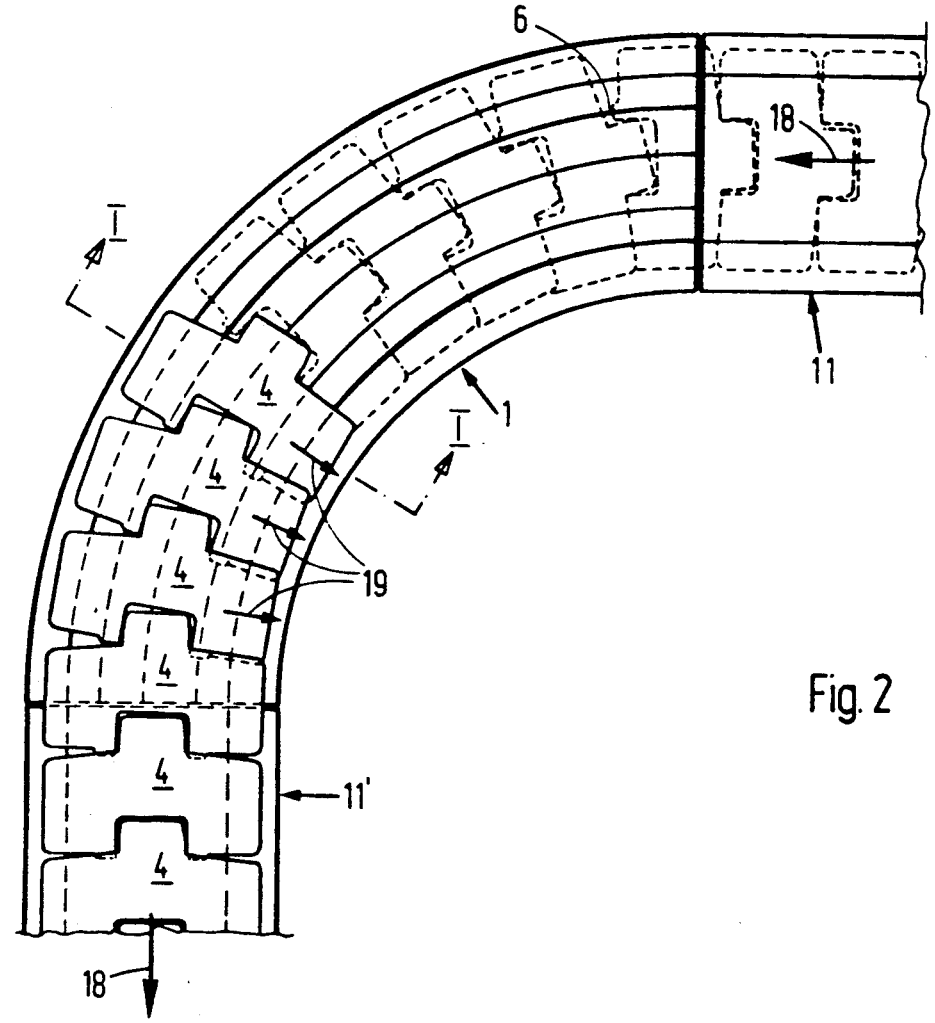

When the chain is pulled in the direction of the arrow 18, a force 19 directed towards the center of the curve will be produced during the passage through a curve, as shown in FIGS. 1 or 2, which force will prevent the chain link from lifting from the outer sliding surface 2 of the curve, because the surfaces 12, 13 will prevent this.

A free passage 15 is provided at the outermost side and between the downwards protruding part 5 of the chain and the outermost side piece 9 of the curve, which passage 15 is wide enough to permit the chain 4 to be lifted off the curve section 1 as soon as the chain is stopped. The slanting surfaces 12, 13 help when the chain is to be lifted, as a vertical pull on the chain will cause the chain links to be displaced outwardly and the free passage 15 to be diminished. The chain may now be freely lifted from the curve section and freely be put back in place again. As soon as the driving wheel is again started and a pull 18 is again applied to the chain, this will automatically be pulled back in place as shown in FIG. 1.

The free space 16 in the opposite side prevents friction between the chain links and the side piece 9 at the inside of the curve. In case the chain links are under great load the free space 16 may be omitted, so that the load on the surfaces 12, 13 is reduced, as some of the friction and thereby some of the load is taken over by other surfaces. The life of both the chain and the curve section is hereby considerably prolonged.

FIG. 2 shows the same conveyor as FIG. 1, but seen from above, and in the shape of a single track which extends from a straight track 11 to another straight track 11' via a 90° curve section 1. The curve section 1 is provided with a longitudinally extending profile 6 which profile is not necessary in the straight tracks 11 and 11'. If the curve section 1 is to be cleaned, for example to remove the remnants of a broken bottle or the like, the conveyor chain 4 is simply stopped, the chain is lifted off the track where the need is, the track is cleaned, and the chain thereafter simply put back in place again, whereafter the conveyor may again be started. Such a cleaning operation may be executed very quickly because the chain does not have to be opened.

The embodiment of the profile 6 and the downwards protruding parts 5 as shown in FIGS. 1 and 2, is only an example of how the curve sections and the chain links may be designed according to the invention. It will be obvious to an expert in the field that the same effect as explained above may be obtained by many other embodiments of the chain links and the curve sections, provided that such embodiments have parts which in the described way may interact with each other and automatically keep the chain down in the correct plane during the passage of the curves.

Figure 3:
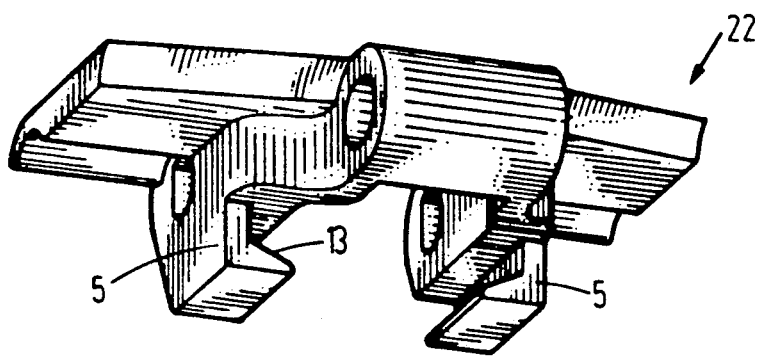
Figure 3:
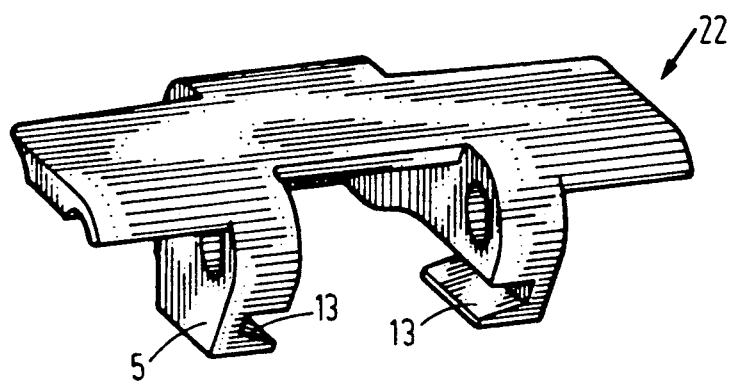
Figure 4:
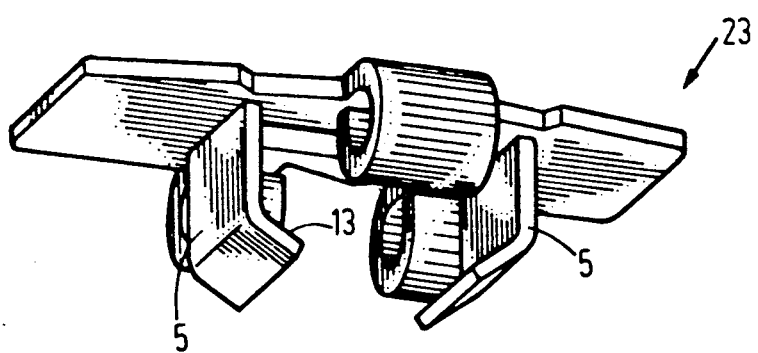
Figure 4:
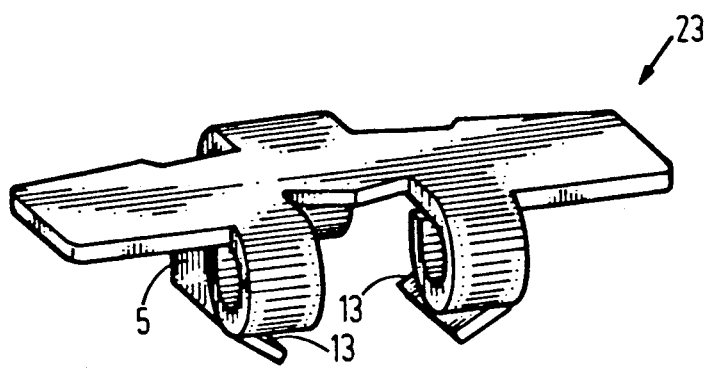

FIGS. 3A and 3B show an example of a plastic chain link according to the invention, and FIGS. 4A and 4B shown an example of a steel chain link according to the invention. Both chain links are shown with a smooth surface, but may of course be designed in any known way with ribs, rollers, friction means or the like. If only the chain links are provided with downwards protruding parts or cams which have slanting and inwards sloping sides or surfaces 13, it will be possible to use them with tracks or courses of the above mentioned kind, so that the advantages described may be obtained.

Figure 5:
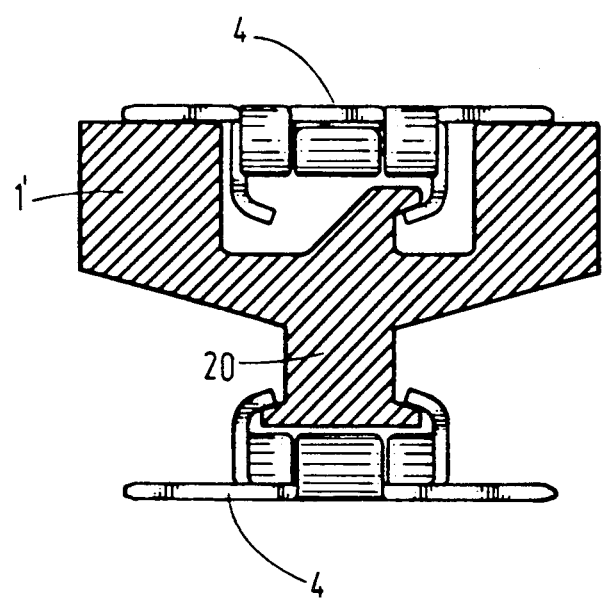

A similar chain link conveyor is shown in FIG. 5, in which the curve section 1' comprises a downwards extending inverted T-shaped part 20, on which the chain may be guided freely suspended for the return run to facilitate cleaning, sterilizing, lubrication, inspection etc. Any chain, for example of the kind shown in FIGS. 3 or 4, may be guided for return in this simple way, so that the desired technical advantages in respect of cleaning are obtained.

I claim:

1. A curve section for a chain link conveyor, the curve section comprising at least two spaced parallel sliding surfaces, a longitudinally extending slot or recess means for accommodating downwardly projecting parts of respective chain links of the chain link conveyor, at least one profile means disposed in the slot or recess means between the sliding surfaces and extending in parallel to the sliding surfaces for engaging at least one of said downwardly projecting parts of the chain links in such a manner so as to enable the chain link conveyor to be removed from the curve section by a displacement of the chain link conveyor in a direction away from said profile means.

2. A curve section for a chain link conveyor, the curve section comprising at least two parallel sliding surfaces placed at a distance from each other, a longitudinally extending slot or recess provided between the parallel sliding surfaces for receiving downwardly protruding parts of chain links of the chain link conveyor, at least one profile provided in the slot or recess between the sliding surfaces, said profile extends parallel to the sliding surfaces and is designed to interact with the downwardly protruding parts of the chain links, and wherein said profile has a projection facing outwardly of the curve section.

3. A curve section according to claim 2, wherein a longitudinally extending slanting sliding surface is provided on or at the projection.

4. A curve section according to claim 3, wherein the slanting surface is substantially planar and is tilted inwardly towards a center of the curve section.

5. A curve section according to one of claims 1, 2, 3 or 4, wherein the sliding surfaces are disposed in parallel side pieces, a bridge piece is disposed between and interconnects the side pieces, said at least one profile means is arranged on said bridge piece, said profile means, said side pieces and said bridge piece are integrally formed in one piece.

6. A curve section according to claim 5, wherein said side pieces are provided with parallel grooves or tracks on opposed faces at a lower end of the respective side faces accommodating a return run of the chain links.

7. A curve section according to one of claims 3 or 4, wherein the slanting side surface is located at a position outwardly of a centerline of the conveyor chain in the curve section.

8. A curve section according to claim 5, wherein the respective chain links and downwardly projecting parts are integrally formed in one piece.

9. A curve section according to claim 8, wherein the side pieces and the chain link are formed of the same material.

10. A curve section according to claim 9, wherein said material is a synthetic material.

11. A chain link conveyor comprising a chain displaceable along a track including two parallel sliding rails, said chain including a plurality of interconnected adjoining chain links, each of said chain links include extending portions slidable along the sliding rails and downwardly projecting connecting parts disposed in an area between the sliding rails, wherein said downwardly projecting portions include oppositely disposed projection means facing a central plane of the chain link, at least one of said projection means is engageable with a profile provided between the sliding rails in such a manner so as to enable removal of the chain link conveyor from the sliding rails by displacement of the chain link in a direction away from the profile.

12. A chain link conveyor according to claim 11, wherein the projection means comprise a slanted sliding surface adapted to engage the profile.

13. A chain link conveyor according to claim 12, wherein the slanting sliding surface is substantially planar and tilts downwardly and inwardly toward a central plane of the chain link.

14. A chain link conveyor according to one of claims 11, 12 or 13, wherein the track includes at least one curve section, and wherein an area between the profile and an outermost side piece of the curve section is dimensioned so as to provide a free passage large enough to permit the chain links to be lifted free of the curve section.

15. A chain link conveyor according to claim 14, wherein the profile includes a projection facing outwardly of the curve section.

16. A chain link conveyor according to claim 15, wherein a longitudinally extending slanting sliding surface is provided on or at the projection of the profile.

17. A chain link conveyor according to claim 16, wherein the slanting surface of the projection of the profile is 18. A chain link conveyor according to claim 17, wherein the sliding rails are disposed on parallel side pieces, a bridge piece is disposed between and interconnects the side pieces, said profile being arranged on said bridge piece, and wherein said profile, said side pieces and said bridge piece are integrally formed in one piece.

19. A chain link conveyor according to claim 17, wherein the sliding rails are disposed on parallel side pieces, a bridge piece is disposed between and interconnects the side pieces, said profile being arranged on said bridge piece, and wherein said profile, said side pieces and said bridge piece are integrally formed in one piece, wherein said side pieces are provided with parallel grooves or tracks on opposed faces at a lower end of the respective side pieces for accommodating a return run of the chain links.

20. A chain link conveyor according to claim 16, wherein the slanting sliding surface of the profile is located at a position outwardly of a centerline of the chain.

21. A conveyor system comprising at least one chain movable along at least one track, said track including two spaced parallel sliding rails, and said chain including uniform interconnected chain links, wherein interacting means are provided on the respective chain links and said at least one track for automatically holding the chain down in a correct plane even in curved sections of the conveyor system due to forward progressing movement of the chain during operation of the conveyor system, said interacting means including downwardly projecting legs or side pieces provided with slanting surfaces on the respective chain links, and a projection provided between said sliding rails, said interacting means on the respective chain links and said at least one track being arranged so as to enable a free lifting of the chain links from the sliding rails in the curved sections upon a stopping of the conveyor system.

22. A chain link for a conveyor, the chain link being constructed so that a plurality of chain links may be interconnected to form a conveyor chain, wherein one side of the chain link includes at least one of a projection or a cam provided with a slanted inwardly tilted side surface cooperable with at least one projection provided on a conveyor track of the conveyor system incorporating the chain links for enabling a free lifting of the chain links in a curved section of the conveyor track upon a stopping of the conveyor system.

* * * * *